No. 625,508. Patented May 23, 1899.
J. W. HYATT.
APPARATUS FOR WASHING FILTER BEDS.
(Application filed Dec. 19, 1898.)
(No Model.)
Fig. 1.
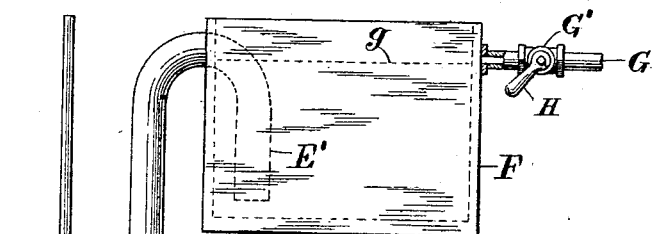
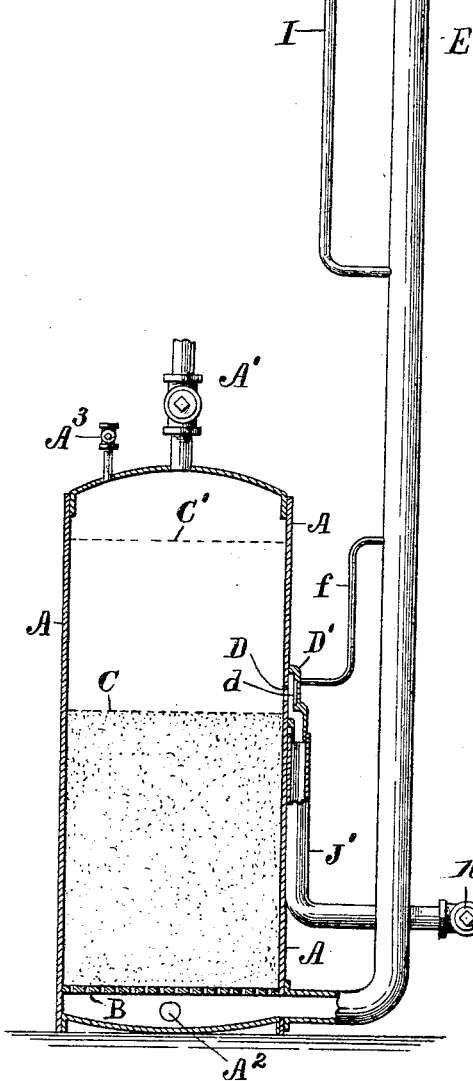
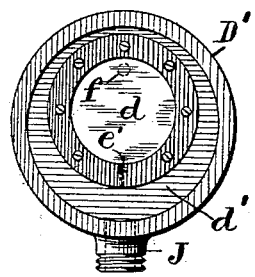
Fig. 2.
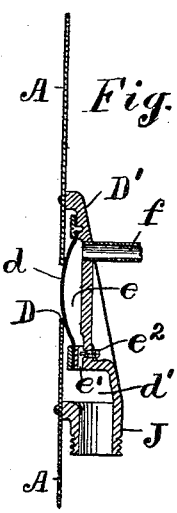
Fig. 3.
Attest:
L. Lee
Edw. F. Kinsey
Inventor.
John W. Hyatt, per
Thomas S. Crane, Atty.

UNITED STATES PATENT OFFICE.

JOHN W. HYATT, OF NEWARK, NEW JERSEY.

APPARATUS FOR WASHING FILTER-BEDS.

SPECIFICATION forming part of Letters Patent No. 625,508, dated May 23, 1899.

Application filed December 19, 1898. Serial No. 699,645. (No model.)

*To all whom it may concern:*

Be it known that I, JOHN W. HYATT, a citizen of the United States, residing at Newark, county of Essex, State of New Jersey, have invented certain new and useful Improvements in Processes of and Apparatus for Washing Filter-Beds, fully described and represented in the following specification and the accompanying drawings, forming a part of the same.

This invention relates to that class of filters having a granular filter-bed through which the water is forced downwardly during the filtering operation and is washed by a reverse current forced into the filter beneath the filter-bed and operating to lift and disintegrate the same and separate the impurities therefrom. In such operation the granular material of the bed is loosened and diffused in the washing-water, and its upper portion is lifted above the normal level of the bed with the impurities, and a free discharge of the washing-water from the filter-casing with the granular material suspended therein permits a portion of the granular material to escape.

It has been common heretofore to diminish the escape of the granular material by forming the waste-outlet close to the top of the filter-casing and interposing a baffle-plate or analogous construction to the outflowing current of water to arrest the granular material and retain it within the casing. With every precaution it is necessary in filters thus constructed to avoid the loss of granular material by limiting the flow of the washing-water. With the flow thus limited it has been found necessary to repeat the agitation of the bed many times or to protract it considerably to entirely cleanse the same.

It is the object of the present invention to facilitate the rapid and violent agitation of the bed and the subsequent discharge of the foul washing-water without incurring the loss of the granular material, and thus cleanse the bed more rapidly and effectively.

My improved method consists, chiefly, in retaining the washing-water within the filter after each agitation until the filter-bed has substantially subsided and then discharging the washing-water and impurities from the filter near the level of the filter-bed. By discharging the washing-water at such point the outflowing current of water sweeps over the surface of the bed and tends to remove any of the weightier impurities that may have nearly subsided with the granular material. The impurities, however, are always of much less specific gravity than the material of the bed and are thus deposited upon the top of the same, so as to be swept away by the outflowing current. My construction thus includes a waste-water valve having an outlet-opening within the casing near the top of the filter-bed and means for retaining such valve closed during the agitation and subsidence of the bed. Such valve is of course entirely closed during the use of the bed for filtering. The water may be retained within the filter-bed by any means adapted to close the waste-outlet during the agitation of the bed and to open it after the subsidence of the same, and where desired such closing and opening of the outlet may be effected by a hand-moved valve; but where the flushing of the filter-bed is effected by an intermittent current from an elevated tank the variations of pressure in such current furnish a means of automatically actuating the valve and holding the outlet closed in the required manner.

In a copending application I have shown and claimed an apparatus for intermittingly supplying a current of washing-water to the bottom of the filter-casing, and the intermittent flow of current produces variations of pressure in the water-supplying pipe, which are adapted to operate upon a piston or other pressure agent connected with the valve, so as to close the same when the water is pressing upwardly within the filter and to permit the same to open when the supply of water and its pressure ceases. Such construction is shown in the annexed drawings, in which—

Figure 1 is a diagram of a filter having my invention applied thereto, the parts being shown in section at the center line where hatched. Fig. 2 represents the inner side of the valve-box removed from the filter-casing, and Fig. 3 is a section of the valve-box upon the center line with the adjacent wall of the filter-casing.

A designates the filter-casing, which is shown closed at the top and provided with a water-supply pipe A' and air-vent cock $A^3$.

B designates a screen within the bottom of the casing to support the granular material C, and $A^2$ designates an outlet for the filtered water below such screen. Such outlet would be closed, as is usual, during the washing of the filter.

D designates the outlet for the washing-water, to the outer side of which a valve-box D' is applied.

E designates the pipe for supplying the washing-water below the screen B, and F a flush-tank provided with supply-pipe G, having cock G', with handle H, to supply the tank during the washing operation. The pipe E is extended within the tank at the top and downwardly to form a siphon E'. The valve-box is shown with a diaphragm-valve $d$, stretched over a pressure-chamber $e$, which is connected by a pipe $f$ with the pipe E, at the level to which the filter is commonly filled by each charge of the washing-water. The box has an outlet-chamber $d'$.

In Fig. 1 the outlet D is shown open; but in Fig. 3 the diaphragm is shown forced against the outlet, so as to close the same, as occurs when fluid under suitable pressure is supplied to the pipe $f$ and chamber $e$. To vent the pressure-chamber $e$ and secure the opening of the outlet within a suitable period of time after the filter-bed has been flushed, a small hole $e'$ is extended from the chamber $e$ to the chamber $d'$, and a regulating-screw $e^2$ is extended from the outer side of the valve-box into such hole to vary the opening of the same. When the valve is open, the waste water flows past the face of the diaphragm into an outlet-chamber $d'$, supplied with a nozzle J, which is connected with a waste-pipe J'. The pipe J' is provided with cock K to retain the outlet closed during the operation of filtering.

In a closed filter the entire casing is normally filled with water, which would obstruct the disintegration of the bed and the upward flow of the washing-current unless it were discharged, and such discharge is effected before the washing operation by opening the waste-cock K and the air-vent $A^3$, the water within the head of the filter then flowing out by its gravity. To effect the washing with this apparatus, the cock G' to the flush-tank is opened, and when the water reaches the level $g$ in such tank it flows out of the siphon into the pipe E and through the screen B into the filter-bed, its pressure operating also through the pipe $f$ to close the outlet-valve $d$. The contents of the tank and the flow of water through the cock G' are so proportioned that the pipe E will deliver into the filter-casing only a sufficient charge of water to raise the level to a suitable point, as indicated by the dotted line C' near the top of the casing, and the pipe $f$ is connected with the pipe E a little above such level, so that when the water reaches an equilibrium in the pipe and filter-casing the water in the pressure-chamber $e$ will be affected only by the head within the pipe $f$. This head is intended to hold the valve closed for a short time after the filter has been flushed to permit the subsidence of the granular material, and the screw or needle valve $e^2$ is adjusted to prevent the escape of water from the pipe F and pressure-chamber $e$ before such subsidence is effected and to permit the opening of the valve $d$ to discharge the washing-water and impurities as soon as the bed has subsided. After the discharge of the tank F by the operation of the siphon E' the tank is again filled by the continuous inflow of water from the pipe G, and the operation of the siphon is automatically repeated after a suitable interval of time, during which the subsidence of the bed and the discharge of the washing-water are effected. The bed is then disintegrated again by another charge of washing-water, and the washing-water is held within the casing by the valve $d$ until the bed subsides, as before, when the washing-water is discharged during the refilling of the tank F, and such cycle of operations is repeated so long as the supply of water to the flush-tank is continued.

The screw $e^2$ or equivalent means for affording relief to the pressure in the chamber $e$ may be readily regulated to operate in the desired manner, and the valve G', which supplies the tank, may also be adjusted to renew the charges of washing-water intermittingly at suitable intervals, which afford the time required for the subsidence of the bed and the escape of the impurities through the outlet D.

With this apparatus the operation of washing the bed is entirely automatic and requires the operator only to empty the head of the filter, close the outlet $A^2$ in the bottom of the casing, and open to the desired degree the cock G', which supplies the flush-tank F.

It is evident that a valve may be operated by the water-pressure in the pipe E through the agency of a piston working in a cylinder and by any other means which is affected by the variations of pressure in such pipe during the flow of the successive charges of washing-water, and I have therefore claimed, broadly, any pressure agent or other suitable means for closing the valve during the agitation and subsidence of the bed and for then opening the outlet to discharge the washing-water and impurities.

The herein-described method of washing the filter-bed is especially applicable for use with the intermittent supply of washing-water, which furnishes variations of pressure for operating an outlet-valve automatically; but the method is obviously independent of any particular mechanism.

Having thus set forth the nature of the invention, what is claimed herein is—

1. In a filter having a granular filter-bed, that method of washing the bed by a reverse current, which consists first, during the washing operation, in directing an upward current through the bed to lift and disintegrate the granular material and separate the impurities therefrom, second, retaining the washing-water within the filter during such disintegration, and afterward until the filter-bed has substantially subsided, and third, discharging the washing-water and impurities freely from the filter in a current swept across the surface of the filter-bed to remove the impurities therefrom, substantially as herein set forth.

2. In a filter having a granular filter-bed, the combination, with a casing having an inlet-screen for washing-water at the bottom with the granular material resting thereon and partly filling the filter-casing, and the casing having a waste-water valve with an outlet-opening leading from the interior of the casing adjacent to the normal surface of the filter-bed, of means for forcing water upwardly through the bed to disintegrate and wash the same, and means operating to retain the washing-water and impurities above the bed until the bed has subsided, and then discharge the water from the said outlet, whereby the current of escaping water moves across the surface of the bed to sweep the impurities therefrom, substantially as herein set forth.

3. In a filter having a granular filter-bed, the combination, with a casing having an inlet-screen for washing-water at the bottom with the granular material resting thereon and partly filling the filter-casing, and the casing having a waste-water valve with an outlet-opening leading from the interior of the casing adjacent to the normal surface of the filter-bed, and below the level of the granular material when disintegrated during the washing operation, of a valve applied to the said outlet, and automatic means operating to close the valve during each agitation and subsidence of the filter-bed, and to open the valve for discharging the washing-water, substantially as herein set forth.

4. In a filter having a granular filter-bed, the combination, with a casing having an inlet-screen for washing-water at the bottom with the granular material resting thereon and partly filling the filter-casing, and the casing having a waste-water valve with an outlet-opening leading from the interior of the casing adjacent to the normal surface of the filter-bed, of means for forcing water intermittingly upward through the bed during the washing of the filter, means for retaining the washing-water and impurities above the bed during each agitation and subsidence of the bed, and automatic means for opening the outlet-valve for discharging the washing-water near the level of the bed intermediate to such agitations, whereby currents of escaping water are intermittingly moved across the surface of the bed to sweep the impurities therefrom, substantially as herein set forth.

5. The combination, with a filter-casing having a granular filter-bed and an outlet above the bed for the washing-water, of a valve applied to such outlet, a pipe supplying water intermittingly under pressure beneath the filter-bed for successively disintegrating and washing the bed, a pressure agent for applying the said valve, and a connection to the said supply-pipe whereby the variation of water-pressure therein closes the said valve during the successive agitations and subsidences, and opens the valve to permit the escape of the washing-water intermediate to the successive disintegrations, substantially as herein set forth.

In testimony whereof I have hereunto set my hand in the presence of two subscribing witnesses.

JOHN W. HYATT.

Witnesses:
  FRANK L. MORTON,
  THOS. S. CRANE.